(12) United States Patent
Kawai et al.

(10) Patent No.: US 10,281,078 B2
(45) Date of Patent: May 7, 2019

(54) COATED METAL PIPE FOR VEHICLE PIPING AND METHOD FOR PRODUCING SAME

(71) Applicant: SANOH INDUSTRIAL CO., LTD., Shibuya-ku, Tokyo (JP)

(72) Inventors: Naoki Kawai, Koga (JP); Takanori Kon, Koga (JP); Norinobu Kusunoki, Koga (JP); Akira Sugitani, Koga (JP)

(73) Assignee: SANOH INDUSTRIAL CO., LTD., Shibuya-Ku, Tokyo (JP)

( * ) Notice: Subject to any disclaimer, the term of this patent is extended or adjusted under 35 U.S.C. 154(b) by 0 days.

(21) Appl. No.: 15/550,762

(22) PCT Filed: Feb. 10, 2016

(86) PCT No.: PCT/JP2016/053979
§ 371 (c)(1),
(2) Date: Aug. 11, 2017

(87) PCT Pub. No.: WO2016/129639
PCT Pub. Date: Aug. 18, 2016

(65) Prior Publication Data
US 2018/0045357 A1    Feb. 15, 2018

(30) Foreign Application Priority Data

Feb. 13, 2015   (JP) .................................. 2015-026152

(51) Int. Cl.
*F16L 58/10*   (2006.01)
*C23C 22/34*   (2006.01)
(Continued)

(52) U.S. Cl.
CPC ............ *F16L 58/1072* (2013.01); *C09D 5/08* (2013.01); *C23C 22/34* (2013.01); *C23C 22/82* (2013.01);
(Continued)

(58) Field of Classification Search
CPC ................................ F16L 9/147; F16L 58/109
(Continued)

(56) References Cited

U.S. PATENT DOCUMENTS 6,312,812 B1 * 11/2001 Hauser ..................... B05D 7/14
                                                                428/412
7,476,445 B2 *  1/2009 Saito ....................... C09D 5/084
                                                               106/14.05
(Continued)

FOREIGN PATENT DOCUMENTS

CN        101341273 A        1/2009
CN        101868564 A       10/2010
(Continued)

OTHER PUBLICATIONS

International Search Report and Written Opinion for International Application No. PCT/JP2016/053979 dated Apr. 26, 2016, in 10 pages.

(Continued)

*Primary Examiner* — Patrick F Brinson
(74) *Attorney, Agent, or Firm* — Procopio, Cory, Hargreaves & Savitch LLP

(57) ABSTRACT

Disclosed is a coated metal pipe including a metal pipe and a multi-layered coating film that covers an outer circumferential surface of the metal pipe. The multi-layered coating film includes a chemical conversion layer and a primer layer, and these layers are provided in this order from the inside. The chemical conversion layer contains a zirconium oxide and/or a zirconium hydroxide. The primer layer contains a polyamide imide and/or an epoxy resin.

11 Claims, 2 Drawing Sheets

(51) Int. Cl.
*C23C 28/00* (2006.01)
*F16L 9/02* (2006.01)
*C23C 22/82* (2006.01)
*C09D 5/08* (2006.01)
*B05D 7/14* (2006.01)
*B05D 7/00* (2006.01)
*B05D 1/18* (2006.01)
*B05D 3/02* (2006.01)
*B05D 5/08* (2006.01)

(52) U.S. Cl.
CPC ............... *C23C 28/00* (2013.01); *F16L 9/02* (2013.01); *B05D 1/18* (2013.01); *B05D 3/0254* (2013.01); *B05D 5/083* (2013.01); *B05D 7/146* (2013.01); *B05D 7/51* (2013.01); *B05D 2202/10* (2013.01); *B05D 2254/02* (2013.01); *B05D 2504/00* (2013.01); *B05D 2505/00* (2013.01); *C23C 2222/20* (2013.01)

(58) Field of Classification Search
USPC .............. 138/143, 145, 146; 428/36.9, 36.91
See application file for complete search history.

(56) References Cited

U.S. PATENT DOCUMENTS

| | | | |
|---|---|---|---|
| 9,115,440 B2* | 8/2015 | Kubota | ................ C08G 18/283 |
| 2004/0028921 A1* | 2/2004 | Amouroux | ............ C08F 255/02 |
| | | | 428/459 |
| 2010/0247947 A1* | 9/2010 | Tamura | .................... B32B 1/08 |
| | | | 428/586 |
| 2013/0153077 A1* | 6/2013 | Kon | ......................... C23C 2/02 |
| | | | 138/143 |
| 2014/0213722 A1* | 7/2014 | Hirota | ................ C08G 73/1071 |
| | | | 524/600 |

FOREIGN PATENT DOCUMENTS

| | | |
|---|---|---|
| CN | 107073898 A | 8/2017 |
| DE | 19634222 A1 | 2/1998 |
| EP | 2405031 A1 | 1/2012 |
| JP | 2002-097408 A | 4/2002 |
| JP | 2003-213456 A | 7/2003 |
| JP | 2003-277982 A | 10/2003 |
| JP | 2004-144995 A | 5/2004 |
| JP | 2006-249459 A | 9/2006 |
| JP | 2006-328445 A | 12/2006 |
| JP | 2009-024211 A | 2/2009 |
| JP | 2009-179848 A | 8/2009 |
| JP | 2009-209394 A | 9/2009 |
| JP | 2009-275287 A | 11/2009 |
| JP | 2010-084198 A | 4/2010 |
| JP | 2012-062519 A | 3/2012 |
| JP | 5108820 A | 12/2012 |
| JP | 5225662 B2 | 7/2013 |
| JP | 2014-173123 A | 9/2014 |

OTHER PUBLICATIONS

Extended European Search Report for EP App No. 16749282.6 dated Jun. 19, 2018, 8 pgs.

International Preliminary Report on Patentability for PCT App No. PCT/JP2016/053979 dated Aug. 24, 2017, 10 pgs.

Office Action for related CN App No. 201680009091.2, dated Aug. 28, 2018, 9 pgs.

* cited by examiner

COATED METAL PIPE FOR VEHICLE PIPING AND METHOD FOR PRODUCING SAME

The present application is a National Stage entry of PCT/JP2016/053979, filed on Feb. 10, 2016, and claims priority to Japanese Patent Application No. 2015-026152, filed on Feb. 13, 2015, the contents of which are incorporated by reference in their entirety.

TECHNICAL FIELD

The present invention relates to a coated metal pipe for vehicle piping and a production method therefor.

BACKGROUND ART

An outer circumferential surface of a metal pipe used as fuel piping or the like for a vehicle is generally protected by various coating films in order to secure corrosion resistance, chemical resistance, and the like (for example, Patent Literatures 1 to 4).

CITATION LIST

Patent Literature

Patent Literature 1: Japanese Patent No. 5225662
Patent Literature 2: Japanese Unexamined Patent Publication No. 2003-213456
Patent Literature 3: Japanese Unexamined Patent Publication No. 2003-277982
Patent Literature 4: Japanese Unexamined Patent Publication No. 2004-144995

SUMMARY OF INVENTION

Technical Problem

When a coating film is damaged during using a coated metal pipe having a coating film as piping, in some cases, the coating film is peeled off from the damaged portion or corrosion resistance is significantly decreased. In particular, since a coated metal pipe for vehicle piping has high possibility that a coating film thereof is damaged, adhesiveness and corrosion resistance of the coating film in the damaged portion of the coating film are very important.

In this regard, a main object of the present invention is to improve adhesiveness and corrosion resistance of a coating film when the coating film is damaged, regarding a coated metal pipe which is used for vehicle piping and includes a multi-layered coating film that covers a metal pipe.

Solution to Problem

An aspect of the present invention relates to a coated metal pipe for vehicle piping including a metal pipe and a multi-layered coating film that covers an outer circumferential surface of the metal pipe. In this coated metal pipe, the multi-layered coating film includes a chemical conversion layer and a primer layer, and these layers are provided in this order from the inside. The chemical conversion layer contains a zirconium oxide and/or a zirconium hydroxide and the primer layer contains a polyamide imide and/or an epoxy resin. In other words, the aspect of the present invention relates to application of the coated metal pipe as vehicle piping or application of the coated metal pipe for producing vehicle piping.

Based on the findings of the present inventors, adhesiveness and corrosion resistance when the coating film is damaged are significantly improved by a combination of the chemical conversion layer containing a zirconium oxide or the like and the primer layer containing a polyamide imide and/or an epoxy resin.

Another aspect of the present invention relates to a method for producing a coated metal pipe, including a step of forming, on an outer circumferential surface of a metal pipe, a multi-layered coating film that covers the outer circumferential surface. In this method, the step of forming the multi-layered coating film may include forming a chemical conversion layer on the outer circumferential surface by subjecting the outer circumferential surface of the metal pipe to surface treatment with a chemical conversion treatment solution containing hexafluorozirconic acid and/or a salt thereof and forming a primer layer containing a polyamide imide and/or an epoxy resin on an outer circumferential surface of the chemical conversion layer.

Advantageous Effects of Invention

According to one aspect of the present invention, it is possible to improve adhesiveness and corrosion resistance when a coating film is damaged, regarding a coated metal pipe which is used for vehicle piping and includes a multi-layered coating film that covers a metal pipe. In addition, the coated metal pipe according to the present invention is also excellent in adhesiveness between layers constituting the multi-layered coating film.

DESCRIPTION OF EMBODIMENTS

Hereinafter, preferred embodiments of the present invention will be described in detail. However, the present invention is not limited to the following embodiments.

Figure 1:
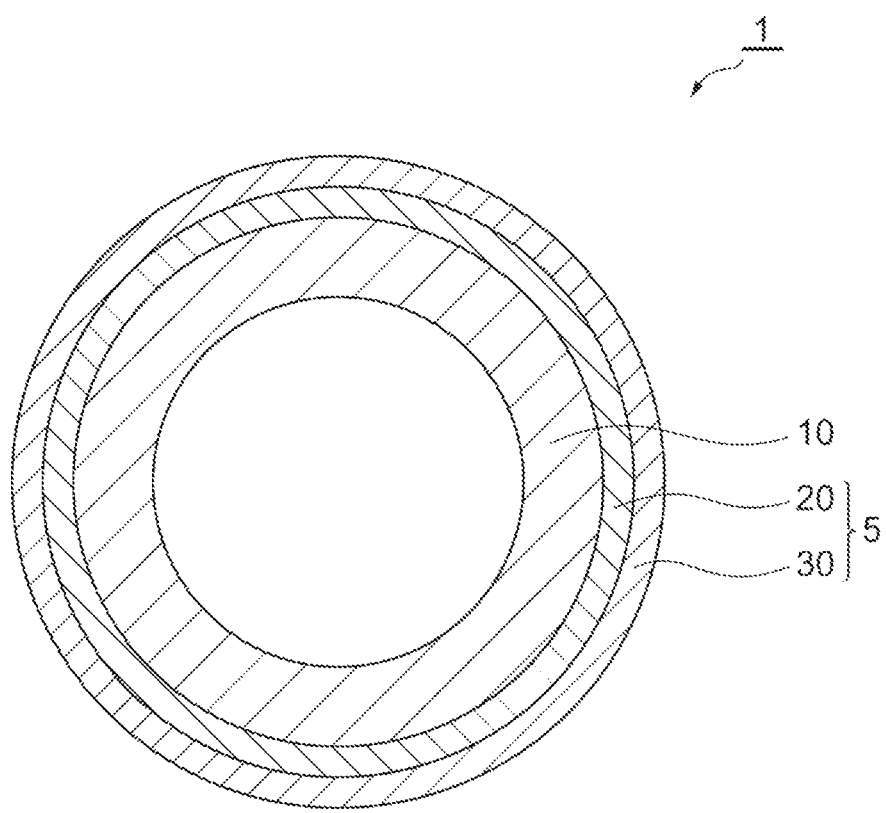
FIG. 1 is a cross-sectional view illustrating an embodiment of a coated metal pipe.

FIG. 1 is a cross-sectional view illustrating a coated metal pipe according to an embodiment. FIG. 1 illustrates the cross-section perpendicular to the longitudinal direction of the coated metal pipe. A coated metal pipe 1 illustrated in FIG. 1 includes a metal pipe 10 and a multi-layered coating film 5 that covers an outer circumferential surface of the metal pipe 10. The multi-layered coating film 5 includes a chemical conversion layer 20 and a primer layer 30, and these layers are provided in this order from the inside. The multi-layered coating film 5 may cover the entire outer circumferential surface of the metal pipe 10 or the multi-layered coating film 5 may not be provided at a portion in which the coating film is not necessary.

The metal pipe 10 is not particularly limited as long as it is a tubular metal molded body, but for example, the metal pipe may be a steel pipe or a metal alloy pipe other than the steel pipe. The steel pipe may be a single-wall steel pipe formed by rolling up a steel sheet in a tubular shape or a double-wall steel pipe formed by rolling up a steel sheet, the surface of which has been subjected to plating (copper plating or the like), twice in a tubular shape.

The outer diameter of the metal pipe 10 is not particularly limited, but may be, for example, 4 to 42 mm. The thickness of the metal pipe 10 may be, for example, 0.35 to 2.0 mm.

The chemical conversion layer 20 is a layer formed by substituting the outer circumferential surface of the metal pipe to surface treatment with a chemical conversion treatment solution. The chemical conversion treatment solution for forming the chemical conversion layer 20 may contain hexafluorozirconic acid ($H_2ZrF_6$) and/or a salt thereof. In the present specification, "containing hexafluorozirconic acid and/or a salt thereof" is the expression also including expression of containing hexafluorozirconate ions ($ZrF_6^{2-}$) formed by dissociating hexafluorozirconic acid and/or a salt thereof. The hexafluorozirconic acid salt may be, for example, ammonium hexafluorozirconate, potassium hexafluorozirconium, or the like.

The chemical conversion layer 20 may contain a zirconium oxide ($ZrO_2$ or the like), a zirconium hydroxide ($ZrO_2.nH_2O$ or the like), or a combination thereof. The zirconium oxide and the zirconium hydroxide are typically generated from hexafluorozirconic acid or a salt thereof in the chemical conversion treatment solution.

The total content of the zirconium oxide and the zirconium hydroxide may be 1 to 30% by mass based on the mass of the chemical conversion layer 20. According to this, more excellent effect in terms of adhesiveness of the coating film can be obtained. From the same point of view, the total content of the zirconium oxide and the zirconium hydroxide may be 3 to 20% by mass or 5 to 15% by mass.

The total concentration of hexafluorozirconic acid and a salt thereof in the chemical conversion treatment solution may be 0.1 to 1.5% by mass or 0.3 to 0.8% by mass based on the mass of the chemical conversion treatment solution. According to this, more excellent effect in terms of adhesiveness of the coating film can be obtained.

The chemical conversion treatment solution for forming the chemical conversion layer 20 may contain a silane coupling agent having a reactive functional group and a silyl group. To the silyl group, a hydrolyzable group such as an alkoxy group or an alkyloyloxy group is bonded. The reactive functional group may be, for example, at least one functional group selected from an amino group, an epoxy group, a (meth)acrylic group, a vinyl group, and a mercapto group. Of them, a silane coupling agent having an amino group may be selected. When the chemical conversion layer contains the silane coupling agent, further excellent effect in terms of corrosion resistance can be obtained. The silane coupling agent in the chemical conversion layer 20 may form a chemical bond with a metal atom or the like on the metal pipe surface or may form a silicon oxide.

The content of the silane coupling agent in the chemical conversion treatment solution may be 100 to 600 parts by mass, 200 to 500 parts by mass, or 300 to 400 parts by mass when the mass of the hexafluorozirconate ions (including those present in the form of an acid or a salt) are regarded as 100 parts by mass. When the content of the silane coupling agent is within these ranges, further significant effects in terms of adhesiveness and the like can be obtained.

The chemical conversion layer 20 may contain a silicon oxide ($SiO_2$ or the like). The silicon oxide in the chemical conversion layer 20 is typically derived from the silane coupling agent in the chemical conversion treatment solution. The content of the silicon oxide in the chemical conversion layer 20 may be 100 to 600 (70 to 450) parts by mass, 200 to 500 (150 to 400) parts by mass, or 300 to 400 (200 to 300) parts by mass when the total content of the zirconium oxide and the zirconium hydroxide is regarded as 100 parts by mass. When the content of the silicon oxide is within these ranges, further significant effects in terms of adhesiveness and the like can be obtained.

The chemical conversion treatment solution for forming the chemical conversion layer 20 may contain an organotitanium chelate compound. The organotitanium chelate compound has a titanium atom and a chelate ligand that is coordinated with the titanium atom. The organotitanium chelate compound having the chelate ligand is not generally hydrolyzed in an aqueous solution, and is present in a stable state. Examples of the organotitanium chelate compound include titanium diisopropoxy bis(triethanolaminate) and titanium lactate.

The chemical conversion layer 20 may contain a titanium oxide ($TiO_2$ or the like). The titanium oxide in the chemical conversion layer 20 is typically derived from the organotitanium chelate compound in the chemical conversion treatment solution. The content of the titanium oxide in the chemical conversion layer 20 may be 10 to 60 parts by mass, 15 to 45 parts by mass, or 20 to 30 parts by mass when the total content of the zirconium oxide and zirconium hydroxide is regarded as 100 parts by mass. When the content of the titanium oxide is within these ranges, further significant effects in terms of adhesiveness and the like can be obtained.

The chemical conversion treatment solution may contain a vanadium compound. This vanadium compound may contain oxovanadium ions ($[VO]^{2+}$ or the like). The valence of vanadium in the oxovanadium ions may be 3, 4, or 5. The concentration of the vanadium compound in the chemical conversion treatment solution may be, for example, 0.005 to 0.04% by mass based on the mass of the chemical conversion treatment solution.

The chemical conversion layer 20 may contain a vanadium oxide. The vanadium oxide in the chemical conversion layer 20 is typically derived from the vanadium compound in the chemical conversion treatment solution. The content of the vanadium oxide in the chemical conversion layer 20 may be 0.1 to 40 parts by mass or 1.5 to 25 parts by mass when the total content of the zirconium oxide and the zirconium hydroxide is regarded as 100 parts by mass. When the chemical conversion layer contains the vanadium oxide, further significant effects in terms of corrosion resistance and the like can be obtained.

The chemical conversion layer 20 may contain an atom selected from a zirconium atom, a titanium atom, a silicon atom, and a vanadium atom as an atom constituting a compound other than the zirconium oxide, the zirconium hydroxide, the titanium oxide, and the vanadium oxide. The chemical conversion layer 20 may contain a metal atom or a semimetal atom selected from silicon, molybdenum, tungsten, vanadium, manganese, nickel, cobalt, chromium, lead, and the like. A part or the whole of these atoms may be contained as an atom constituting a compound such as an acid, a salt, a complex, an oxide, or the like in the chemical conversion layer 20. For example, as described above, the chemical conversion layer 20 may contain a silicon oxide ($SiO_2$). The chemical conversion layer 20 may be a non-chromate chemical conversion layer, which does not substantially contain trivalent chromium.

The chemical conversion layer 20 may contain at least one kind of resin selected from a urethane resin, an acrylic resin, a polyolefin, a phenolic resin, an epoxy resin, and the like. These resins may be aqueous resins that can be dissolved or dispersed in water. Of them, when the urethane resin is used in combination with a primer layer containing a polyamide imide resin and/or an epoxy resin, particularly excellent adhesiveness and corrosion resistance can be exerted. These resins can be blended in the form of an emulsion with the chemical conversion treatment solution to be described later.

The urethane resin is not particularly limited as long as it is a polymer that contains a urethane bond. The acrylic resin is not particularly limited as long as it is a polymer that contains acrylic acid ester and/or (meth)acrylic acid ester as a monomer unit. The polyolefin is not particularly limited as long as it is a polymer of an olefin such as ethylene.

The epoxy resin is a compound having one or two or more epoxy groups. The epoxy resin may be selected, for example, from bisphenol A type epoxy resins. The phenolic resin is typically a compound that is generated by reaction between phenol and formaldehyde and has one or two or more phenolic hydroxyl groups. When the chemical conversion layer contains the epoxy resin or the phenolic resin, at least a part thereof may form a cross-linked structure.

The ratio of the resin in the chemical conversion layer 20 may be 250 to 750 (250 to 950) parts by mass, 350 to 650 (350 to 850) parts by mass, or 450 to 550 (450 to 750) parts by mass when the total mass of the zirconium oxide and the zirconium hydroxide is regarded as 100 parts by mass. Alternatively, the ratio of the resin in the chemical conversion layer 20 may be, for example, 0.1 to 99.9% by mass based on the mass of the chemical conversion layer 20.

The chemical conversion layer 20 may contain other components as necessary in addition to the above components. Examples of the other components which the chemical conversion layer 20 may contain include a surfactant, mineral oil, and polyimide silane.

The chemical conversion layer 20 can be formed by a method of treating the outer circumferential surface of the metal pipe 10 or a surface of a plated layer to be described later with a chemical conversion treatment solution. The chemical conversion treatment solution may contain the aforementioned components such as hexafluorozirconic acid ($H_2ZrF_6$) and/or a salt thereof and water that dissolves or disperses these components. The pH of the chemical conversion treatment solution may be 5 to 9. According to this, a multi-layered coating film excellent in corrosion resistance can be formed.

The adhesion amount of the chemical conversion layer 20 is not particularly limited, but may be, for example, 5 to 400 (5 to 1000) mg/m². This adhesion amount is the mass of the chemical conversion layer per unit area of the outer circumferential surface.

The chemical conversion layer 20 can be formed, for example, by a method including: forming a film of the chemical conversion treatment solution containing water on the outer circumferential surface of the metal pipe 10; and removing water from the film of the chemical conversion treatment solution. The formation of the film of the chemical conversion treatment solution can be performed by an arbitrary method such as immersing or spraying. Water in the film of the chemical conversion treatment solution is removed by heating the film as necessary. The heating method is not particularly limited, but for example, methods such as hot air heating, infrared heating, and high frequency heating may be selected. The heating temperature may be, for example, 60 to 200° C. In the process of heating the film of the chemical conversion treatment solution, a compound such as a zirconium oxide, a zirconium hydroxide, a titanium oxide, a silicon dioxide, a titanium oxide, or a vanadium oxide can be generated from the component in the chemical conversion treatment solution.

The primer layer 30 may contain a polyamide imide, an epoxy resin, or a combination thereof. The polyamide imide is a polymer containing a constituent unit having an amide group and an imide group. The constituent unit having an amide group and an imide group is represented, for example, by the following formula. In the formula, R represents a divalent organic group, and R of plurality in the same molecule may be the same as or different from one another. R may be an alkylene group or an arylene group.

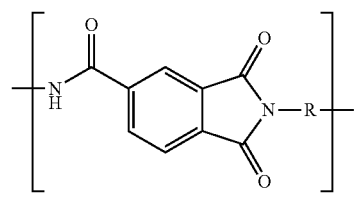

As the epoxy resin of the primer layer, the same epoxy resin as described above regarding the chemical conversion layer can be used. The primer layer may contain a cross-linked structure body formed by self-polymerization of the epoxy resin and/or the reaction between the epoxy resin and a curing agent.

The primer layer 30 may contain at least one additive component selected from a polyamide, a fluorine resin, and a silicon oxide. As the additive component, a polyamide and/or a fluorine resin may be selected. By using the polyamide and the fluorine resin, further excellent corrosion resistance can be achieved.

The polyamide, which may be used in combination with the polyamide imide, may be a polymer containing a constituent unit having an amide group (not having an imide group). For example, the polyamide may be selected from polyamide 6, polyamide 66, polyamide 11, polyamide 12, polyamide 612, polyamide 1010, and polyamide 1012. The polyamide may be dissolved with the polyamide imide to form a single phase containing the polyamide imide and the polyamide or to form a microphase-separated structure having a phase containing the polyamide imide and a phase containing the polyamide.

The fluorine resin is a polymer composed of a constituent unit having a fluorine atom, and typically is a polyolefin containing a monomer unit derived from a fluorine-substituted olefin. The fluorine resin may be selected, for example, from poly(vinyl fluoride) (PVF), poly(vinylidene fluoride) (PVdF), and polytetrafluoroethylene (PTFE). As the fluorine resin, particularly, poly(vinyl fluoride) and/or poly(vinylidene fluoride) may be used.

The silicon oxide can be generated from a compound which has an alkoxysilyl group and a reactive functional group other than the alkoxysilyl group and is known as the silane coupling agent.

The ratio of the polyamide imide in the primer layer may be 10% by mass or more, 20% by mass or more, or 30% by mass or more, and may be 90% by mass or less, 70% by mass or less, or 50% by mass or less, based on the mass of the primer layer. The ratio of the epoxy resin in the primer layer may be 10% by mass or more, 20% by mass or more, or 30% by mass or more, and may be 90% by mass or less, 70% by mass or less, or 50% by mass or less, based on the mass of the primer layer. The ratio of the additive component may be 1% by mass or more, 10% by mass or more, or 15% by mass or more, and may be 50% by mass or less, 30% by mass or less, or 15% by mass or less, based on the mass of the primer layer. When each component is within these numerical ranges, particularly significant effects in terms of corrosion resistance improvement and the like can be easily obtained. The upper and lower limit numerical values can be arbitrarily combined to specify the numerical ranges. The same applies to descriptions related to other numerical values in the present specification.

The ratio of the additive component may be 1% by mass or more, 10% by mass or more, or 15% by mass or more, and may be 50% by mass or less, 30% by mass or less, or 15% by mass or less, based on the mass of the primer layer. When each component is within these numerical ranges, particularly significant effects in terms of corrosion resistance improvement and the like can be easily obtained.

The primer layer may not substantially contain a cross-linkable component (a phenolic resin or the like) which may form a cross-linked polymer by cross-linking reaction. For example, the ratio of the phenolic resin in the primer layer may be 0% by mass or more and less than 11% by mass, or 0% by mass or more and less than 1% by mass, based on the mass of the primer layer. When the primer layer does not substantially contain the phenolic resin, or contains the phenolic resin at a ratio of less than 11% by mass, corrosion resistance when the coating film is damaged may be further improved.

The ratio of the polyester in the primer layer may be 0% by mass or more and less than 11% by mass based on the mass of the primer layer. When the primer layer does not substantially contain the polyester, or contains the polyester at a ratio of less than 11% by mass, corrosion resistance when the coating film is damaged may be further improved.

The thickness of the primer layer 30 is not particularly limited, but for example, may be 0.5 to 20 μm or 1 to 10 μm.

The primer layer 30 may further contain other component as necessary in addition to the above components.

The primer layer 30 can be formed, for example, by a method including: forming a film of the primer composition containing a solvent on the outer circumferential surface of the metal pipe 10 and then removing the solvent from the film of the primer composition. The formation of the film of the primer composition can be performed by an arbitrary method such as immersing or coating. Water in the film of the primer composition is removed by heating the film as necessary. The heating method is not particularly limited, but for example, methods such as hot air heating, infrared heating, and high frequency heating may be selected.

The primer composition may contain the polyamide imide, the epoxy resin, and the like, a solvent that dissolves or disperses these components, and other components (for example, a curing agent of the epoxy resin) that are added as necessary.

The ratio of the polyamide imide in the primer composition may be 10% by mass or more, 20% by mass or more, or 30% by mass or more, and may be 90% by mass or less, 70% by mass or less, or 50% by mass or less, based on the total mass of components other than the solvent in the primer composition. The ratio of the epoxy resin in the primer composition may be 10% by mass or more, 20% by mass or more, or 30% by mass or more, and may be 90% by mass or less, 70% by mass or less, or 50% by mass or less, based on the mass of the primer composition. When each component is within these numerical ranges, particularly significant effects in terms of corrosion resistance improvement and the like can be easily obtained. In general, the ratio of each component other than the solvent in the primer composition is substantially identical to the ratio of each component in the primer layer.

The solvent used in the primer composition is selected, for example, from γ-butyrolactone and N-methylpyrrolidone.

The total ratio (concentration) of components other than the solvent in the primer composition is 5% by mass or less based on the total mass of the primer composition. When the concentration of the components other than the solvent is too high, aggregation of the resin tends to easily occur.

Figure 2:
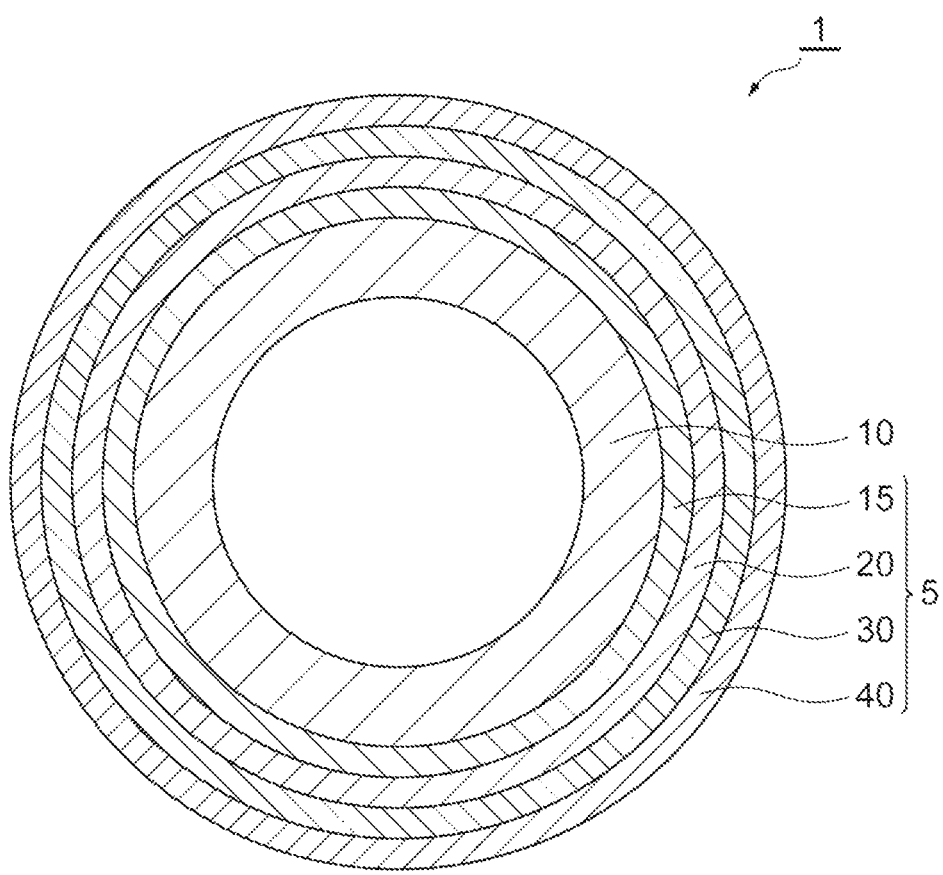
FIG. 2 is a cross-sectional view illustrating an embodiment of a coated metal pipe.

FIG. 2 is also a cross-sectional view illustrating a coated metal pipe according to an embodiment. The multi-layered coating film 5 of the coated metal pipe 1 illustrated in FIG. 2 further includes a plated layer 15 that is provided between the metal pipe 10 and the chemical conversion layer 20 and a resin layer 40 that covers the outer circumferential surface of the primer layer 30, in addition to the same metal pipe 10, chemical conversion layer 20, and primer layer 30 as in the coated metal pipe of FIG. 1.

The plated layer 15 is not particularly limited, but for example, is metal plating formed by wet plating such as electroplating or electroless plating or dry plating such as hot dipping. As the wet plating, for example, electrogalvanizing or electroless nickel plating is suitable. As the dry plating, for example, hot dipping zinc coating, hot dipping aluminum coating, hot dipping zinc-aluminum alloy coating, and hot dipping Sn alloy coating are suitable. A metal constituting the plated layer 15 may be one kind or two or more kinds. The plated layer 15 may be, for example, a hot-dipped layer containing aluminum, magnesium, and zinc.

The thickness of the plated layer 15 is not particularly limited, but for example, may be 1 to 100 μm or 10 to 30 μm.

The resin layer 40 is a layer containing a thermosetting resin and/or a thermoplastic resin as main components. The thermosetting resin is generally contained as a cured product thereof in the resin layer 40. The resin layer 40 may contain, for example, a polyamide or a fluorine resin. When the resin layer 40 containing the polyamide or the fluorine resin and the primer layer according to this embodiment are combined, particularly excellent adhesiveness and corrosion resistance can be achieved. The polyamide and the fluorine resin can be selected from examples mentioned as the components of the primer composition.

The thickness of the resin layer 40 is not particularly limited, but for example, may be 1 to 200 μm.

The resin layer 40 can be formed, for example, by a method of forming, on the primer layer 30, a film of a liquid composition (coating material) containing a resin such as a thermoplastic resin and a solvent that dissolves or disperses the resin and removing the solvent from the liquid composition on the primer layer 30.

The present invention is not limited to the above-described embodiments, but can be appropriately changed in a range not departing from the gist of the present invention. For example, the coated metal pipe may further have other layer(s) like a top coat layer that covers the outer circumferential surface of the resin layer 40. The top coat layer may contain a thermoplastic resin selected from polypropylene, polyethylene, and the like.

EXAMPLES

Hereinafter, the present invention will be described in more detail by means of Examples. However, the present invention is not limited to these Examples.

1-1. Production of Coated Metal Steel Sheet for Evaluation

A coated metal steel sheet for evaluation having a hot-dipped steel sheet and a multi-layered coating film formed from a chemical conversion layer and a primer layer that are formed in this order on the surface of the steel sheet was produced by the following procedures.

A chemical conversion treatment solution having a composition presented in Table 1 was prepared. "Y" in the table and 4, unevenness in coating of the primer layer was slightly recognized. In other Examples and Comparative Examples, unevenness in coating of the primer layer was not recognized.

TABLE 1

| Chemical conversion treatment solution | Ex. 1 | Ex. 2 | Ex. 3 | Ex. 4 | Comp. Ex. 1 | Comp. Ex. 2 | Comp. Ex. 3 |
|---|---|---|---|---|---|---|---|
| pH | 6 | 7 | 6 | 9 | 10 | 5 | 9 |
| $ZrF_6^{2-}$ | Y | Y | Y | Y | | | |
| Organotitanium chelate compound | | Y | | | | | Y |
| Magnesium compound | | | | | | Y | Y |
| Vanadium compound | | | | | | | Y |
| $SiO_2$ | | | Y | Y | | | |
| Phosphorus compound | | | | | | Y | |
| Silane coupling agent having amino group | Y | Y | Y | | Y | | |
| Urethane resin | Y | Y | Y | | | | |
| Epoxy resin | | | | Y | | | |
| Phenolic resin | | | | | Y | Y | |
| Acrylic resin | | | | | | | Y |
| Primer layer | PAI/PA | PAI/PA | PAI/PA | PAI/PA | PAI/PA | PAI/PA | PAI/PA |
| Adhesiveness (existence of peeling-off) | Absent | Absent | Absent | Absent | Present | Present | Present |
| Corrosion resistance (peeled-off width/mm) | 1.5 | 1.2 | 3.1 | 2.2 | — | — | — | indicates that the chemical conversion treatment solution contains the corresponding component. For example, a chemical conversion treatment solution of Example 2 contains about 70 parts by mass of an organotitanium chelate compound (titanium diisopropoxy bis(triethanolaminate)), about 480 parts by mass of a urethane resin (SUPERFLEX 650 (trade name), manufactured by DKS Co. Ltd.), and about 330 parts by mass of a silane coupling agent having an amino group (Sila-Ace S320 (trade name), manufactured by Chisso Corporation) when the content of hexafluorozirconate ions ($ZrF_6^{2-}$) is regarded as 100 parts by mass.

A hot-dipped steel sheet was immersed in the chemical conversion treatment solution. The chemical conversion treatment solution adhered to the steel sheet was dried by heating the hot-dipped steel sheet extracted from the chemical conversion treatment solution for 1 minute in a hot-air drying furnace set at 100° C. to thereby form a chemical conversion layer (adhesion amount: 200 mg/m²).

A primer liquid containing a polyamide imide (PAI, VYLOMAX HR (trade name), manufactured by TOYOBO CO., LTD.), a polyamide (PA, 2015 (trade name), manufactured by ThreeBond Co., Ltd.) and γ-butyrolactone as a solvent and not containing a phenolic resin was prepared. The ratio of the polyamide imide in the primer liquid was set to 89% by mass based on the total mass of the polyamide imide and the polyamide. The ratio of the polyamide was 11% by mass based on the total mass of the polyamide imide and the polyamide. The hot-dipped steel sheet having the chemical conversion layer formed thereon was immersed in the primer liquid. The primer liquid adhered to the steel sheet was dried by heating the hot-dipped steel sheet extracted from the primer liquid for 1 minute in a hot-air drying furnace set to 250° C. to thereby form a primer layer. The thickness of the primer layer was 5 μm. In Examples 3

1-2. Evaluation

Adhesiveness

Two cutouts intersecting with each other were formed on the chemical conversion layer and the primer layer of the coated metal steel sheet for evaluation. The cutouts were formed to have a depth reaching the hot-dipped steel sheet. Thereafter, the coated metal steel sheet for evaluation was left to stand for 144 hours in a salt spray test (SST). Thereafter, a pressure-sensitive adhesive tape was pasted on a portion on which the cutouts were formed and then the pressure-sensitive adhesive tape was peeled off therefrom. The existence of peeling-off of the multi-layered coating film at this time was confirmed.

Corrosion Resistance

The corrosion resistance of each coated steel sheet for evaluation of Examples was evaluated. Cutouts having a depth reaching the hot-dipped steel sheet were formed on the chemical conversion layer and the primer layer of the coated metal steel sheet for evaluation. Then, the coated metal steel sheet for evaluation was immersed for 168 hours in 5% by mass of NaCl aqueous solution set to 80° C. Thereafter, the width of a portion from which the multi-layered coating film was peeled off was measured.

As presented in Table 1, it was confirmed that when the primer layer containing the polyamide imide is formed on the chemical conversion layer, excellent adhesiveness and corrosion resistance can be obtained in the chemical conversion layer which is formed by using the chemical conversion treatment solution containing hexafluorozirconate ions and contains a zirconium oxide and/or zirconium hydroxide.

2-1. Production of Coated Metal Pipe for Evaluation

A coated metal pipe for evaluation having a plated metal pipe and a multi-layered coating film formed from a chemical conversion layer, a primer layer and a top layer that are formed in this order on the surface of the plated metal pipe was produced by the following procedures.

A chemical conversion treatment solution containing a component presented in Table 2 was prepared. "Y" in the table indicates that the chemical conversion treatment solution contains the corresponding component. In the table, the organotitanium chelate compound is titanium diisopropoxy bis(triethanolaminate) and the urethane resin is SUPER-FLEX 650 (trade name, manufactured by DKS Co. Ltd.). Example 5 and Comparative Example 4 are the same chemical conversion treatment solution.

The plated metal pipe having a Zn plated layer was immersed in these chemical conversion treatment solutions. The chemical conversion treatment solution adhered to the plated metal pipe was dried by heating the metal pipe extracted from the chemical conversion treatment solution for 1 minute in a hot-air drying furnace set to 100° C. to thereby form a chemical conversion layer (adhesion amount: 200 mg/m$^2$).

A primer liquid containing 30% by mass of an epoxy resin (EPICLON 7050, manufactured by DIC Corporation) and an aromatic hydrocarbon-based thinner as a solvent was prepared. Further, a primer liquid containing 25% by mass of a phenolic resin (PHENOLITE, manufactured by DIC Corporation) and an aromatic hydrocarbon-based thinner as a solvent was prepared. The hot-dipped metal pipe having the chemical conversion layer formed thereon was immersed in these primer liquids. The combination of the chemical conversion layer and the primer layer is as presented in Table 2. The primer liquid adhered to the plated metal pipe was dried by heating the plated metal pipe extracted from the primer liquid for 1 minute in a hot-air drying furnace set to 250° C. to thereby form a primer layer. The thickness of the primer layer was 5 µm. In any cases, abnormality regarding coating properties such as unevenness in coating was not recognized.

The plated metal pipe having the primer layer was immersed in a coating material containing a fluorine resin. The coating material adhered to the plated metal pipe was dried by heating the plated metal pipe extracted from the coating material for 1 minute in a hot-air drying furnace set to 250° C. to thereby form a resin layer containing the fluorine resin as an outermost layer.

TABLE 2

| Chemical conversion treatment solution | Ex. 5 | Comp. Ex. 4 | Comp. Ex. 5 |
|---|---|---|---|
| pH | 7 | 7 | 5 |
| $ZrF_6^{2-}$ | Y | Y | |
| Organotitanium chelate compound | Y | Y | |
| Nickel compound | | | Y |
| Phosphorus compound | | | Y |
| Silane coupling agent having amino group | Y | Y | Y |
| Urethane resin | Y | Y | Y |
| Primer layer | Epoxy resin | Phenolic resin | Epoxy resin |
| Resin layer (outermost layer) | Fluororesin | Fluororesin | Fluororesin |
| Adhesiveness and corrosion resistance (swelling) | 0 to 3 | Many White rust occurrence | Many White rust occurrence |

2-2. Evaluation
Adhesiveness and Corrosion Resistance

The corrosion resistance of the produced coated metal pipe for evaluation was evaluated. Cutouts having a depth reaching the plated metal pipe were formed on the multi-layered coating film of the coated metal pipe for evaluation. Then, the coated metal pipe for evaluation was immersed for 168 hours in 5% by mass of NaCl aqueous solution set to 80° C. Thereafter, the number of swollen portions of the multi-layered coating film and the state of white rust occurrence were observed.

As presented in Table 2, it was confirmed that when the primer layer containing an epoxy resin is formed on the chemical conversion layer, excellent adhesiveness and corrosion resistance can be obtained in the chemical conversion layer which is formed by using the chemical conversion treatment solution containing hexafluorozirconate ions and contains a zirconium oxide and/or zirconium hydroxide.

3. Production and Evaluation of Coated Metal Steel Sheet for Evaluation

A coated metal steel sheet for evaluation having a hot-dip Zn-coated steel sheet and a multi-layered coating film formed from a chemical conversion layer and a primer layer that are formed in this order on the surface of the hot-dip Zn-coated steel sheet was produced by the following procedures.

A chemical conversion treatment solution containing a component presented in Table 3 was prepared. "Y" in the table indicates that the chemical conversion treatment solution contains the corresponding component. For example, the chemical conversion treatment solution of Example 7 contains oxovanadium ions at a concentration of 0.005 to 0.04% by mass.

The hot-dip Zn-coated steel sheet was immersed in the chemical conversion treatment solution. The chemical conversion treatment solution adhered to the steel sheet was dried by heating the hot-dip Zn-coated steel sheet extracted from the chemical conversion treatment solution for 1 minute in a hot-air drying furnace set to 100° C. to thereby form a chemical conversion layer (adhesion amount: 200 mg/m$^2$). In the case of Comparative Example 7, the steel sheet was washed with water before drying.

A primer liquid containing 30% by mass of an epoxy resin (EPICLON 7050, manufactured by DIC Corporation) and an aromatic hydrocarbon-based thinner as a solvent was prepared. Further, a primer liquid containing 25% by mass of a phenolic resin (PHENOLITE, manufactured by DIC Corporation) and an aromatic hydrocarbon-based thinner as a solvent was prepared. The hot-dip Zn-coated steel sheet having the chemical conversion layer formed thereon was immersed in these primer liquids. The combination of the chemical conversion layer and the primer layer is as presented in Table 3. The primer liquid adhered to the plated steel sheet was dried by heating the plated steel sheet extracted from the primer liquid for 1 minute in a hot-air drying furnace set to 250° C. to thereby form a primer layer. Abnormality regarding coating properties such as unevenness in coating was not recognized.

Corrosion Resistance

The corrosion resistance of each coated steel sheet for evaluation was evaluated. Cutouts having a depth reaching the hot-dip Zn-coated steel sheet were formed on the chemical conversion layer and the primer layer of the coated metal steel sheet for evaluation. Next, the coated metal steel sheet for evaluation was immersed for 168 hours in 5% by mass of NaCl aqueous solution set to 80° C. Thereafter, the number of swollen portions of the multi-layered coating film and the state of white rust occurrence were observed.

TABLE 3

| Chemical conversion treatment solution | Ex. 6 | Comp. Ex. 6 | Comp. Ex. 7 | Ex. 7 |
|---|---|---|---|---|
| pH | Neutral | Neutral | Acidic | Neutral |
| $ZrF_6^{2-}$ | Y | Y | | Y |
| Organotitanium chelate compound | Y | Y | | Y |
| Vanadium compound (oxovanadium ions) | | | | Y |
| Nickel compound | | | Y | |
| Phosphorus compound | | | Y | |
| Silane coupling agent having amino group | Y | Y | Y | Y |
| Urethane resin | Y | Y | | Y |
| Primer layer | Epoxy resin | Phenolic resin | Epoxy resin | Epoxy resin |
| Coating properties | No abnormality such as unevenness | No abnormality such as unevenness | No abnormality such as unevenness | No abnormality such as unevenness |
| Corrosion resistance (swelling) | 0 to 3 | Many White rust occurrence | Many White rust occurrence | 0 |

As presented in Table 3, it was confirmed that by forming the chemical conversion layer containing a vanadium oxide using the chemical conversion treatment solution containing a vanadium compound, further excellent effect in terms of corrosion resistance can be obtained.

INDUSTRIAL APPLICABILITY

The metal pipe according to the present invention can be suitably used as vehicle piping such as brake piping and fuel piping.

REFERENCE SIGNS LIST

1 . . . coated metal pipe, 5 . . . multi-layered coating film, 10 . . . metal pipe, 15 . . . plated layer, 20 . . . chemical conversion layer, 30 . . . primer layer, 40 . . . resin layer.

The invention claimed is:

1. A coated metal pipe for vehicle piping, comprising:
a metal pipe; and
a multi-layered coating film that covers an outer circumferential surface of the metal pipe, wherein
the multi-layered coating film includes a chemical conversion layer and a primer layer, the chemical conversion layer and the primer layer being provided in this order from the inside,
the chemical conversion layer contains a zirconium oxide and/or a zirconium hydroxide, and a silane coupling agent having an amino group,
the primer layer contains a polyamide imide, and
the primer layer contains no epoxy resin, or the ratio of an epoxy resin in the primer layer is 50% by mass or less based on the mass of the primer layer.

2. The coated metal pipe for vehicle piping according to claim 1, wherein the chemical conversion layer further contains a silicon oxide.

3. The coated metal pipe for vehicle piping according to claim 1, wherein the chemical conversion layer further contains a titanium oxide.

4. The coated metal pipe for vehicle piping according to claim 1, wherein the chemical conversion layer further contains a urethane resin.

5. The coated metal pipe for vehicle piping according to claim 1, wherein the chemical conversion layer further contains a vanadium oxide.

6. The coated metal pipe for vehicle piping according to claim 1, wherein the primer layer further contains at least one additive component selected from a polyamide, a fluorine resin, and a silicon oxide.

7. A method for producing a coated metal pipe for vehicle piping, comprising a step of forming, on an outer circumferential surface of a metal pipe, a multi-layered coating film that covers the outer circumferential surface, wherein
the step of forming the multi-layered coating film includes:
forming a chemical conversion layer on the outer circumferential surface by subjecting the outer circumferential surface of the metal pipe to surface treatment with a chemical conversion treatment solution containing hexafluorozirconic acid and/or a salt thereof and a silane coupling agent having an amino group; and
forming a primer layer containing a polyamide imide on an outer circumferential surface of the chemical conversion layer, the primer layer containing no epoxy resin or the ratio of an epoxy resin in the primer layer is 50% by mass or less based on the mass of the primer layer.

8. The method according to claim 7, wherein the chemical conversion treatment solution further contains an organotitanium chelate compound.

9. The method according to claim 7, wherein the chemical conversion treatment solution further contains a urethane resin.

10. The method according to claim 7, wherein the chemical conversion treatment solution further contains a vanadium compound.

11. The method according to claim 7, wherein the primer layer further contains at least one additive component selected from a polyamide, a fluorine resin, and a silicon oxide.

* * * * *